US011023556B2

(12) United States Patent
Lenzner

(10) Patent No.: US 11,023,556 B2
(45) Date of Patent: Jun. 1, 2021

(54) WEB PAGE DESIGNING WITH CONTENT BEAM TO DEVICE PREVIEW

(71) Applicant: salesforce.com, inc., San Francisco, CA (US)

(72) Inventor: Marcus Lenzner, Jena (DE)

(73) Assignee: salesforce.com, inc., San Francisco, CA (US)

(*) Notice: Subject to any disclaimer, the term of this patent is extended or adjusted under 35 U.S.C. 154(b) by 0 days.

(21) Appl. No.: 16/508,012

(22) Filed: Jul. 10, 2019

(65) Prior Publication Data

US 2021/0011957 A1    Jan. 14, 2021

(51) Int. Cl.
G06F 17/00 (2019.01)
G06F 16/958 (2019.01)
G06F 16/955 (2019.01)
G06K 19/06 (2006.01)
H04L 9/32 (2006.01)
G06F 40/226 (2020.01)

(52) U.S. Cl.
CPC ........ *G06F 16/958* (2019.01); *G06F 16/9554* (2019.01); *G06F 16/9566* (2019.01); *G06F 40/226* (2020.01); *G06K 19/06037* (2013.01); *H04L 9/3247* (2013.01)

(58) Field of Classification Search
CPC ........ G06F 8/44; G06F 40/134; G06F 40/106; G06Q 30/0276; G06Q 50/167
USPC ....................................................... 715/208
See application file for complete search history.

(56) References Cited

U.S. PATENT DOCUMENTS

| 5,577,188 | A  | 11/1996 | Zhu |
| 5,608,872 | A  | 3/1997  | Schwartz et al. |
| 5,649,104 | A  | 7/1997  | Carleton et al. |
| 5,715,450 | A  | 2/1998  | Ambrose et al. |
| 5,761,419 | A  | 6/1998  | Schwartz et al. |
| 5,819,038 | A  | 10/1998 | Carleton et al. |
| 5,821,937 | A  | 10/1998 | Tonelli et al. |
| 5,831,610 | A  | 11/1998 | Tonelli et al. |
| 5,873,096 | A  | 2/1999  | Lim et al. |
| 5,918,159 | A  | 6/1999  | Fomukong et al. |
| 5,963,953 | A  | 10/1999 | Cram et al. |
| 6,092,083 | A  | 7/2000  | Brodersen et al. |
| 6,169,534 | B1 | 1/2001  | Raffel et al. |
| 6,178,425 | B1 | 1/2001  | Brodersen et al. |
| 6,189,011 | B1 | 2/2001  | Lim et al. |

(Continued)

Primary Examiner — Stephen S Hong
Assistant Examiner — Matthew J Ludwig
(74) Attorney, Agent, or Firm — Jaffery Watson Mendonsa & Hamilton LLP

(57) ABSTRACT

Designing and previewing web pages includes displaying an identifying image encoded with a first uniform resource locator (URL) of a preview web page on a display of a first computing device, the first URL including a location of the preview web page and a token unique to a web page authoring session for the preview web page; receiving, from a second computing device, a second URL obtained by capturing the identifying image on the display of the first computing device by a camera of the second computing device and decoding the captured identifying image to get the second URL by the second computing device; validating the second URL; and sending the preview web page to the second computing device when the second URL is validated. The preview web page may then be displayed on the second computing device.

21 Claims, 5 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 7,830,967 B1 * | 11/2010 | Jannard ............... G06T 3/4038 375/240.26 |
| 7,941,460 B2 * | 5/2011 | Bar-Or ..................... G06F 8/44 707/803 |
| 9,563,970 B2 * | 2/2017 | Davis ..................... G06T 11/00 |
| 9,838,418 B1 * | 12/2017 | Wardle ................... G06F 21/56 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0221231 A1 * | 11/2004 | Madril, Jr. ............ G06F 16/955 715/205 |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0188382 A1 * | 8/2005 | Nagendra ........... G06F 9/45504 719/328 |
| 2008/0005787 A1 * | 1/2008 | Aldred .................. G06F 21/105 726/4 |
| 2009/0177744 A1 | 7/2009 | Marlow et al. |
| 2013/0321435 A1 * | 12/2013 | Stevens, III ............... G06F 3/00 345/522 |
| 2014/0052617 A1 * | 2/2014 | Chawla ................ G06Q 20/102 705/39 |
| 2014/0101722 A1 * | 4/2014 | Moore ................... H04L 63/10 726/4 |
| 2015/0163261 A1 * | 6/2015 | Mahkovec .......... G06F 21/6218 709/204 |
| 2016/0063473 A1 * | 3/2016 | Lee .................... G06Q 20/3224 705/15 |
| 2016/0378439 A1 * | 12/2016 | Straub ..................... G06F 8/61 717/107 |
| 2017/0012980 A1 * | 1/2017 | Sanso ................... H04L 63/168 |
| 2018/0108051 A1 * | 4/2018 | Rygiel ............ G06K 19/06009 |
| 2020/0082389 A1 * | 3/2020 | Regev ................... G06Q 20/10 |

* cited by examiner

WEB PAGE DESIGNING WITH CONTENT BEAM TO DEVICE PREVIEW

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2019, salesforce.com, Inc. All Rights Reserved.

TECHNICAL FIELD

One or more implementations relate to the field of world wide web (WWW) pages, and more specifically, to web page creation and previewing.

BACKGROUND

Online merchants can assemble content that is going to be rendered as part of a web page visible to a customer on a web site (e.g., a business to consumer (B2C) storefront online shopping page). This assembly process typically consists of combining multiple web page components in order to present a frequently changing visual experience to shopper. For example, the merchant may have a new advertising campaign to be scheduled for the upcoming holiday season and wants to build a landing page for this purpose. This landing page will likely contain may web page components, for example, multiple product tiles to promote products, a carousel of top selling products, a blog article describing product features and capabilities, and perhaps even content directed to certain demographic groups, and so on. Further, some components may be added and some components may be deleted from the web page based on time and/or customer segments. One challenge is how to design and preview these web pages for compatible display on various consumer devices prior to publication given the complexity of the changes.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

Figure 1:
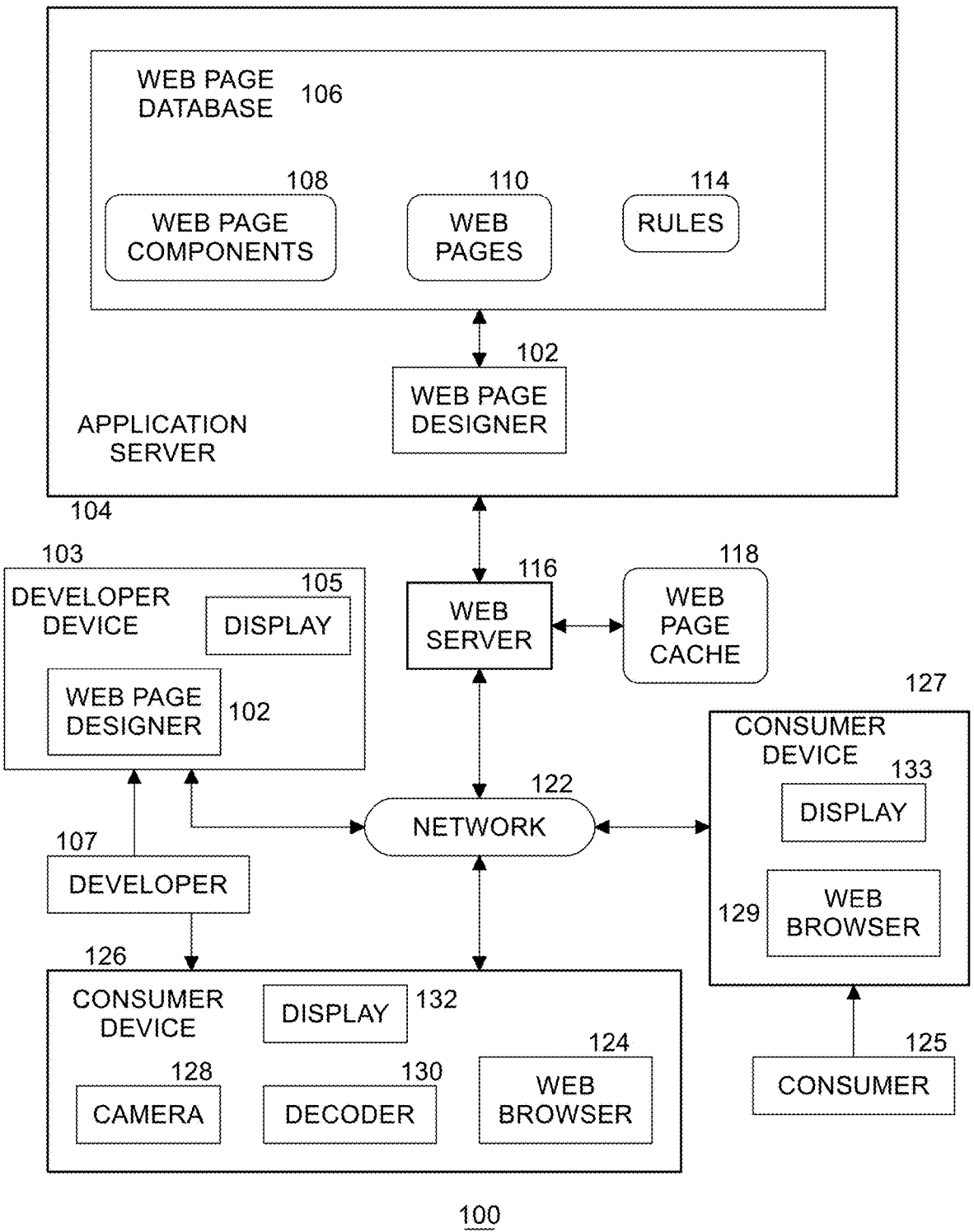
FIG. 1 is a diagram of an example arrangement of web page processing according to an embodiment.

The following description describes a method and apparatus for designing and previewing web pages in an efficient and scalable manner. In embodiments, a web page designer application is provided that includes a content "beam to device" preview feature to allow the web page designer to easily preview how the web page will look on one or more consumer devices (e.g., smart phones, tablet computers, and so on) given selected parameters. This feature is especially advantageous for situations where the web page changes frequently and the web page designer wants to ensure that the changes will look acceptable when displayed on the one or more consumer devices.

Proprietors of e-commerce web sites assemble web page content that is going to be rendered as part of a web page visible to customers. This assembly process typically consists of creating and/or selecting multiple components (e.g., text, images, videos, logos, product information, advertisements, reviews, etc.) in order to present a visual experience to the online shopper. In many cases, the web pages are changed frequently in order to keep the content fresh and engaging for the customer. In other situations, the web pages are updated to reflect changing business conditions, advertising campaigns, promotions, and seasons. For example, the merchant may have a set of web pages for the upcoming holiday season. Each web page contains multiple components. One challenge is that some of those components of the web page may be controlled by one or more rules that control their visibility. For example, one rule may specify that one of the product tiles on the web page should be visible on a specific day during an advertising campaign time frame (e.g., Black Friday, Cyber Monday) and for another rule a certain product tile should only be visible to customers that belong to a selected customer segment (e.g., big spender customers, only men, only students from Texas, customers who have previously purchased certain products, etc.).

In one embodiment, a web page designer application helps merchants with the process of designing web pages and provides the capability to define such visibility rules for the whole web page or even separately for any of the components on the page. The web page designer application provides visual support to the designer during the content authoring process to understand scheduling of components on the web page. For a web page with many components and with one or more of the components having their own scheduling for visibility (e.g., use), the design process can become very complex and hard to understand across all the components on the page changing at different times and for different customer segments. In some cases, the schedules of components may overlap and/or contradict each other, resulting in visual displays to the customer that are not intended. Embodiments overcome such difficulties by providing web page design features to visually represent the components in such a way as to assist the designer in identifying potential problems and correcting the problems before moving the web page to a production web site visible to customers. Embodiments provide a mechanism for a test user (which may be the designer) to easily cause the display of the web page being designed on one or more consumer devices so the test user can verify that the ensuing display is acceptable on one or more consumer devices such as laptop computers, desktop computers, tablet computers, smart phones, and other devices that may have varying display capabilities. For example, if the designer makes a change that looks good on the display of the designer's desktop computer system with a large screen, the designer will also want to ensure that the change looks good on the display of a consumer's smart phone or a tablet.

FIG. 1 is a diagram of an example arrangement 100 of web page processing according to an embodiment. Application server 104 is a computer server that resides in a data center, either one managed by the merchant or by a cloud service provider (CSP). In an embodiment, application server 104 executes code to create hyper-text markup language (HTML) output. In an embodiment, application server 104 is not directly accessible by customers over a network such as the Internet but may be used by a web page designer (also called a developer herein) in a development setting. There may be multiple application servers managed by a CSP. An application server 104 includes a server portion of a web page designer application 102. Web page designer application 102 is an application program used by the merchant (or by a web site developer contracted to design the web site for the merchant) to design web pages 110 for an online storefront (e.g., a merchant web site for selling goods (e.g., products) to customers). The merchant assembles one or more web pages 110 during the design process from multiple web page components 108 using web page designer 102. In an embodiment, a server portion of web page designer 102 runs on application server 104. In another embodiment, at least a portion of web page designer 102 (e.g., a client portion) runs on a developer device 103 (such as a computer system) operated by a developer 107 (e.g., a web page design professional). Developer device 103 includes a display 105 to display the user interface of client-based web page designer application 102, including web pages 110. Web pages 110 include code and/or data that define the web site's format, function and visual appearance. A web page is an assembly of components that can be rendered on the web site. Web pages may be of different page types. A page type includes a definition of a layout and code to produce HTML descriptions of the layout.

In an embodiment, the merchant's web site is run on a cloud computing platform provided by the CSP. Application server 104 includes a web page database 106, which may be integral with the application server or accessible by application server 104 within a cloud computing platform. Web page database 106 includes web pages 110 and web page components 108. Web page components 108 include content items that can be created, selected, and/or configured by the merchant, such as text, images, videos, logos, product codes, product images, banners, advertisements, and so on. Components may include other components in a nested manner. A component may be categorized according to a component type. A component type is a definition of configuration options, and code that produces a markup of a component. The component type may define sub-layouts for nested components.

In an embodiment, web page database 106 includes one or more visibility rules 114. In an embodiment, visibility rules 114 include visibility conditions for one or more components in web page components 108 and web pages 110. Visibility rules 114 are used by web page designer 102 to determine when and under what conditions web page components 108 are to be included and/or visible in web pages 110 to a specific customer at a specific time. Conditions can be based on one or more of any characteristics, customer attributes, demographic information, time, geographic location, Internet Protocol (IP) address, interests, or any other data. In an embodiment, visibility is based on a schedule (e.g., only visible during the holiday season). In an embodiment, visibility is based on defined customer segments (e.g., only visible for male customers from Wyoming). In an embodiment, the customer segments are defined statically by the merchant, dynamically based on changing conditions, or based on rules themselves. For example, rules for customer segments can define customers from certain countries based on geolocation or an address, customers of a certain gender, customers who spent a certain amount of money with the merchant (which could be limited by time), customers who normally order a certain amount of products at one time, customers who visited the web site a certain number of times in a selected time period, customers who clicked on a particular advertisement, customers whose birthday is today, this week, or this month, customers who put a certain number of products in their online shopping basket but never bought them, or customers who make many product returns, and so on. Any rules defining customer segments or otherwise describing customers may be used.

Application server 104 communicates with web server 116. Web server 116 is a computer server that performs caching of web pages, delivery of web pages, load balancing, and secure socket layer (SSL) termination operations. In some embodiments, a plurality of application servers 104 can be coupled with web server 116, and a plurality of web servers 116 can be coupled with an application server. In an embodiment, web server 116 is operated by a CSP. Web server 116 is coupled to network 122 (such as the Internet, for example) for sending web pages to a customer's consumer device 127 as is well known in the art. Consumer device 127 is a computing device such as a personal computer (PC), smart phone, tablet computer, laptop computer, personal digital assistant (PDA), electronic book reader, smart television display, shopping kiosk, or other computing device for running web browser 129 to display web pages 110 on a display 133. Consumer 125 (also known as a user) operates consumer device 127 to see web pages (e.g., "surf the web").

Web server 116 is also coupled to network 122 (such as the Internet, for example) for sending web pages to a consumer device 126 operated by developer 107. Consumer device 126 is a computing device such as a personal computer (PC), smart phone, tablet computer, laptop computer, personal digital assistant (PDA), electronic book reader, smart television display, shopping kiosk, or other computing device for running web browser 124 to display web pages 110 on a display 132. Developer 107 operates consumer device 126 to see web pages (e.g., "surf the web") currently under development. In an embodiment, developer 107 operates consumer device 126 to validate the design of web pages under development prior to publication making the web pages available to consumer 125 on consumer device 127. Consumer device 126 includes a camera 128 (as is well known) and a decoder 130 to decode an identifying image into a uniform resource locator (URL) as described below.

Web server 116 is coupled with web page cache 118. In an embodiment, web page cache 118 is a database in a cloud computing platform provided by the CSP or by the merchant. Web page cache 118 stores web pages for efficient delivery to consumer devices 126, 127. In an embodiment, application server 104 may be combined with web server 116, and web page database 106 and web page cache 118 may be combined into one database.

In an embodiment, web page designer application 102 includes at least two operating modes. A first mode is called an edit mode, wherein a designer selects components to be a part of the web page and web page designer application 102 renders the edited page augmented with visual controls for editing the page (e.g., user interface (UI) controls for changing component properties, for moving components around on the page, etc.). A second mode is called a preview mode, wherein web page designer application renders the edited page without augmentation so the visual result of the changes is as close as possible (in the design and/or test environment) to what the customer will experience when viewing the page in the production environment (e.g., a live online storefront accessible to the public).

When a designer wants to preview the rendering of previously created page, the designer uses web page designer application 102 to configure the preview context. In an embodiment, the preview context includes a selected point in time (including date) and one or more customer segments. Web page designer application 102 applies the preview context, thus causing the visual display of the online storefront represented by the page 110 to refresh its rendering based on the current preview context, effectively simulating as if it were the selected point in time and as if the currently browsing customer is a member of the selected customer segments. (e.g., a previewing a female customer with gold shopping status on Black Friday, for example). This results in the applicable visibility rules 114 being applied as specified. In an embodiment, the preview context and associated visibility rules are applied for both edit mode and preview mode of operation resulting in a consistent prediction of what the page 110 will look like (e.g., visually representing which components 108 are shown or hidden given the preview context). In one embodiment, preview mode results in a read-only presentation of the web page.

A page (acting as a root element of a tree) is comprised on multiple components (acting as nodes within the tree). The hierarchical structure results from merchant interaction with web page designer 102. A sample page with header, footer, an article and a promotional product carousel could look as follows from a structural point of view.

Figure 2:
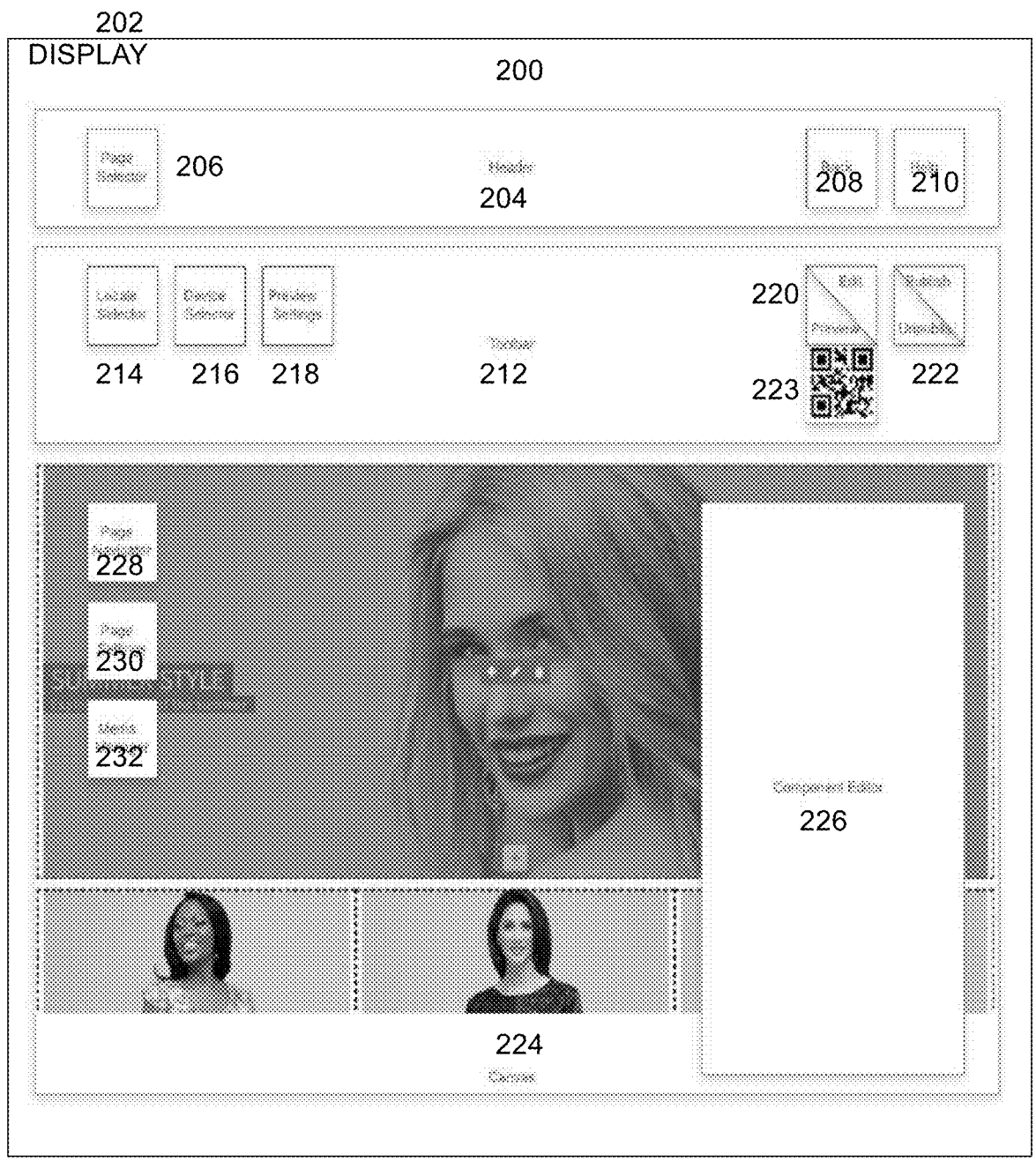
FIG. 2 illustrates an example of a user interface (UI) of a web page designer application according to an embodiment.

Advertising campaign landing page
   Header component
   Article component
   Product carousel component
      Product tile component
      Product tile component
      Product tile component
   Footer component FIG. 2 illustrates an example of user interface (UI) 200 of a web page designer application 102 rendered on a display 202 of a computing device (such as display 105 of developer device 103) according to an embodiment. During edit mode (e.g., page design time), UI 202 includes page header 204, which includes page selector button 206 for selecting a page to edit, back button 208 to exit from the web page designer application and help button 210 to select the display of documentation. UI 202 includes toolbar 212 for user controls. Toolbar 212 includes locale selector 214 for selecting the locale (e.g., language, country) for editing, device selector 216 for selecting a predefined device (e.g., desktop, mobile, tablet, etc.), preview settings 218 for configuring a preview context including customer segments and preview dates, edit/preview toggle 220 for toggling between edit mode and preview mode, and publish/unpublish toggle 222 for enabling/disabling the page for rendering in the live online storefront. When edit mode is selected, web page designer 102 augments the page rendering with UI controls to allow operations on the components that are part of the page. When in edit mode, web page designer does not allow the designer to browse/click within the page, but only allows the designer to use the UI controls described above. When in preview mode, web page designer renders the page without augmentation, and allows the designer to browse/click within the page to check behavioral effects within the page of selections. In both edit and preview modes, a tokenized link to a preview web page may be represented as an identifying image 223. The preview web page shows what the web page being edited will look like on a display as rendered in a web browser (e.g., what a customer would see when navigating to the web page). In an embodiment, the preview web page is shown in canvas 224.

When in edit mode, canvas 224 renders the page with components. The various settings that affect page/component rendering (e.g., locale, preview device, preview context) are applied. Visibility rules 114 as configured for the page and its components are also applied. Canvas 224 allows components of the page to be configured using component editor 226. Page navigator 228 visualizes the hierarchy of components that reside in the page in the shape of a tree view. Page settings 230 allows for changing various properties of the pages (e.g., page visibility rules). Media manager 232 allows for managing static assets (e.g., image upload).

During preview mode, web page designer 102 shows a preview image of a selected web page 110. Device selector 216 allows the developer 107 to select display screen dimensions for previewing the web page as displayed on a consumer device. Preview settings 218 allows the developer to select parameters for including components in the previewed web page. Identifying image 223 comprises a visual representation of data indicating a location (e.g., on a computer system or file system) where the web page being previewed may be accessed and other parameters. In one embodiment, the identifying image is a Quick Response (QR) code, although in other embodiments other two-dimensional matrix barcodes or machine-readable optical labels or images may be used. In one embodiment, identifying image 223 comprises a uniform resource locator (URL) of the preview web page as accessible via application server 104 plus other parameters. The identifying image allows another consumer device (e.g., consumer device 126 operated by developer 107) to scan the identifying image, decode the identifying image into a URL, and fetch and display the preview web page according to the URL.

In embodiments of the present invention, an authoring session of web page designer 102 in which developer 107 edits and previews a web page is associated with a securely encrypted token. Furthermore, there is a dedicated endpoint/controller functionality provided by web page designer 102 on application server 104 which can be called to request previewed web page content, which will return the markup code as given by the web page (including preview parameters) if and only if the correct token is provided. This application server endpoint functionality can be called by any consumer device 126 and will give proper results as long as the consumer device provides the corresponding token. In order to expose the availability of the endpoint/controller functionality in web page designer 102 on application server 104, including the identifier of the page along with preview parameters and the required token, the web page designer application 102 running on developer device 103 packages this information into identifying image 223 (e.g., a QR code) that is visualized in the web page designer application while the developer is editing a page. If the developer logs in to the web page designer application and edits a page, in embodiments of the present invention, the developer can easily scan the identifying image generated and displayed during preview mode with a camera provided by the developer's consumer device 126 (e.g., a smart phone, tablet computer, etc.) and direct the web browser 124 of the developer's consumer device to render that preview web page based on the identifying image. Anyone else that does not have the corresponding web page designer authoring session's token will not be able to access/preview the web page.

One advantage of this approach is that the developer is not required to manually log in to the web page designer application on the developer's consumer device, search for the web page being worked on, select desired preview parameters (point in time, customer segments, etc.), and cause the rendering and display of the preview web page. Instead, the location of the previously rendered preview web page is encoded into the identifying image 223, so the developer can easily scan the identifying image and display the preview web page on a variety of consumer devices to validate the web page design prior to publication.

Figure 3:
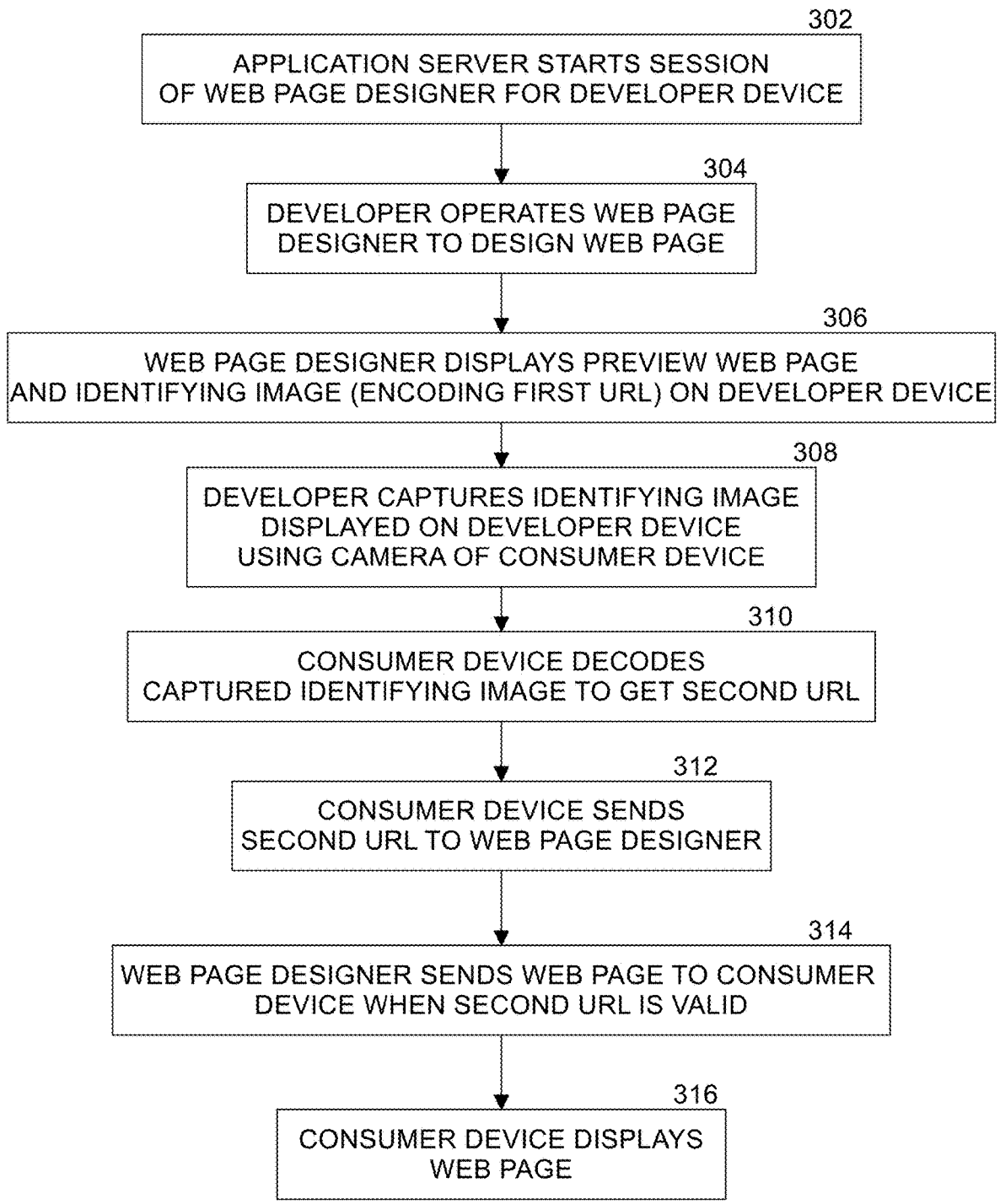
FIG. 3 is a flow diagram of web page display processing by the web page designer application according to an embodiment.

FIG. 3 is a flow diagram 300 of web page display processing by the web page designer application 102 according to an embodiment. At block 302, application server 104 starts a session of client-based web page designer 102 for a developer device 103 operated by a developer 107 and assigns a token to the session. The token binds the output of the web page designer 102 as operated by developer 107 to the web page authoring session. At block 304, developer 107 operates web page designer 102 to design a web page. As part of the design process, web page designer 102 repeatedly renders the web page on display 105 of developer device 103 as the developer edits the web page. At block 306, in an embodiment, based on an input selection received from the developer to display a preview image, client-based web page designer 102 displays the preview web page on display 105 (e.g., in canvas 224) As part of preview mode, web page designer 102 also displays identifying image 223 that encodes a first URL.

Web page designer 102 generates the identifying image 223 including a first URL. As part of this generation processing, client-based web page designer 102 generates a signed token unique to the web page authoring session and the selected preview. In an embodiment, the signed token includes one or more of an expiration date and/or time, a site identifier (e.g., a web storefront site previewed by the web page designer application), a developer identifier (e.g., user of the web page designer application session), and an origin identifier (e.g., a web page designer application session host device such as application server 104). The token may be digitally signed using any known cryptographic technique. As part of this generation processing, web page designer 102 creates the first URL for the web page being previewed. In an embodiment, the first URL includes a location of the web page being previewed for rendering on the application server 104, and one or more additional parameters. In an embodiment, the additional parameters include one or more of the signed token, a page identifier of the web page being previewed, and preview settings. In one embodiment, the preview settings include one or more of a point in time for the preview, other visibility rules, scheduling parameters, and custom groups (e.g., customer segmentations) included in the preview. In one embodiment, the location and the additional parameters are concatenated together to form the first URL.

At block 308, developer 107 uses camera 128 of a consumer device 126 (e.g., a smart phone, a tablet computer, etc.) to capture the identifying image 223 displayed in the preview image of the web page on the display 105 of developer device 103. At block 310, decoder function 130 of consumer device 130 decodes the captured identifying image to get a second URL. At block 312, web browser 124 of consumer device 126 sends the second URL obtained from the capturing and decoding identifying image to server-based web page designer 102 on application server 104. In an embodiment, this includes a function call to an endpoint/controller function in server-based web page designer 102. Server-based web page designer 102 validates the second URL, including the signed token embedded in the second URL. If the second URL is valid, then processing of the web page preview continues. If the signed token is not valid, then an error is returned to the web browser of the consumer device. In an embodiment, to validate the second URL, the web page designer checks one or more of the token subject (e.g., an identification of the preview web page), the expiration date and/or time, the site identifier (e.g., a web storefront site previewed by the web page designer application), the developer identifier (e.g., user of the web page designer application session), and the origin identifier (e.g., a web page designer application session host device such as application server 104). Web page designer may also check additional parameters including one or more of the page identifier of the preview web page, and preview settings. In one embodiment, the preview settings include one or more of a point in time for the preview, other visibility rules, scheduling parameters, and custom groups (e.g., customer segmentations) included in the preview.

If all parameters of the second URL are valid, and all other parameters are checked and passed, such as preview expiration time has not passed, web page designer running on the application server obtains the web page being previewed (as indicated by the page identifier), applies preview settings (such as applying visibility rules and customer segmentation), renders the preview web page, and sends the preview web page associated with the first URL back to the consumer device at block 314. At block 316, the developer's consumer device (using web browser 124) displays the preview web page on display 132. Developer 107 can then examine the display of the preview web page and determine if it is acceptable for publication on consumer device 126. If not, developer 107 continues to edit the web page. This process can be repeated for various consumer devices.

In this way, the design, editing, and previewing of web pages is made more efficient. In some embodiments, the URL may be shared among developers for purposes of review and approval. Once the web page is approved for publication, the web page may be made available for display by web browser 129 of consumer device 127 operated by consumer 125.

One or more parts of the above implementations may include software and/or a combination of software and hardware. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), Flash memory, phase change memory, solid state drives (SSDs)) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists the code/data even when the electronic device is turned off (when power is removed), and the electronic device copies that part of the code that is to be executed by the processor(s) of that electronic device from the non-volatile memory into the volatile memory of that electronic device during operation because volatile memory typically has faster read/write times. As another example, an electronic device may include a non-volatile memory (e.g., phase change memory) to store the code/data when the electronic device is turned off, and that same non-volatile memory has sufficiently fast read/write times such that, rather than copying the part of the code to be executed into volatile memory, the code/data may be provided directly to the processor(s) (e.g., loaded into a cache of the processor(s)); in other words, this non-volatile memory operates as both long term storage and main memory, and thus the electronic device may have no or only a small amount of DRAM for main memory. Typical electronic devices also include a set of one or more physical network interface(s) to establish network connections (to transmit and/or receive code and/or data using propagating signals) with other electronic devices.

Figure 4:
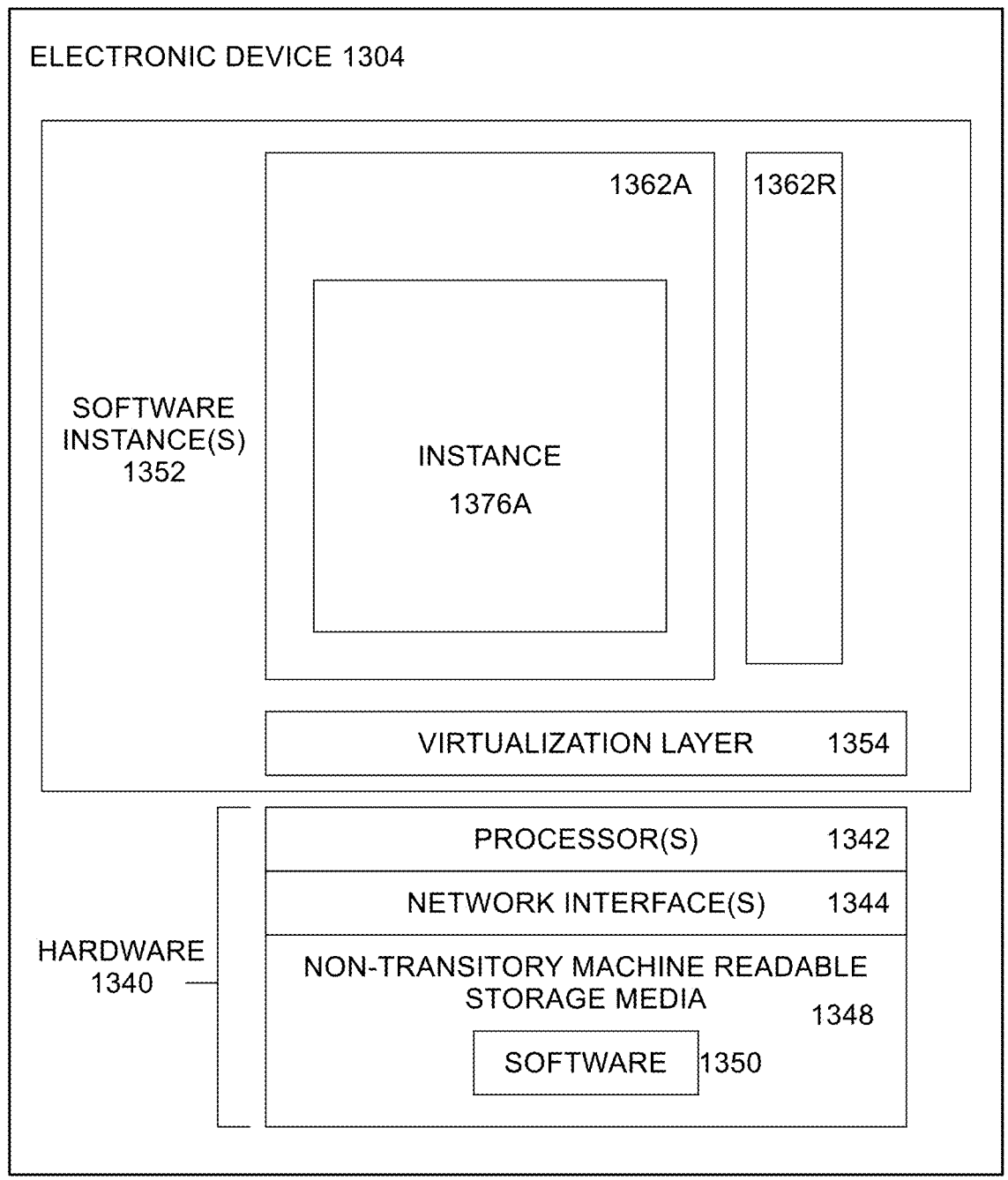
FIG. 4 illustrates an electronic device according to some implementations.

FIG. 4 illustrates an electronic device 1304 according to some implementations. FIG. 4 includes hardware 1340 comprising a set of one or more processor(s) 1342, a set or one or more network interfaces 1344 (wireless and/or wired), and non-transitory machine-readable storage media 148 having stored therein software 1350. Each of the previously described application server 104, web server 116, web page designer application 102, develop device 107, and/or consumer devices 126, 127 may be implemented in one or more electronic devices 1304. In one implementation, each of the consumer devices is implemented in a separate one of the electronic devices 1304 (e.g., in an end user electronic device operated by an end user; in which case, the software 1350 in each such end user electronic device includes the software to implement one of the end user clients, including software to interface with a cloud computing service (e.g., an application programming interface (API), a web browser, a native client, a portal, a command-line interface, etc.)) and each of application server 104, web page designer 102, developer device 107, and web server 116 is implemented in a separate set of one or more of the electronic devices 1304 (in which case, the software 1350 is the software to implement web page design and delivery of application server 104 (including web page designer 102) and web server 116; in operation, the end user electronic devices and the electronic device(s) implementing the cloud computing system containing application server 104 and web server 116 would be commutatively coupled (e.g., by a network) and would establish between them connections for requesting and providing cloud computing services. In an embodiment, application server 104 and web server 116 may be implemented in the same electronic device. Other configurations of electronic devices may be used in other implementations.

In electronic devices that use compute virtualization, the processor(s) 1342 typically execute software to instantiate a virtualization layer 1354 and software container(s) 1362A-R (e.g., with operating system-level virtualization, the virtualization layer 1354 represents the kernel of an operating system (or a shim executing on a base operating system) that allows for the creation of multiple software containers 1362A-R (representing separate user space instances and also called virtualization engines, virtual private servers, or jails) that may each be used to execute a set of one or more applications; with full virtualization, the virtualization layer 1354 represents a hypervisor (sometimes referred to as a virtual machine monitor (VMM)) or a hypervisor executing on top of a host operating system (OS), and the software containers 1362A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 1350 (illustrated as instance 1376A) is executed within the software container 1362A on the virtualization layer 1354. In electronic devices where compute virtualization is not used, the instance 1376A on top of a host operating system is executed on the "bare metal" electronic device 1304. The instantiation of the instance 1376A, as well as the virtualization layer 1354 and software containers 1362A-R if implemented, are collectively referred to as software instance(s) 1352.

Alternative implementations of an electronic device may have numerous variations from that described above. For example, customized hardware and/or accelerators might also be used in an electronic device.

Figure 5:
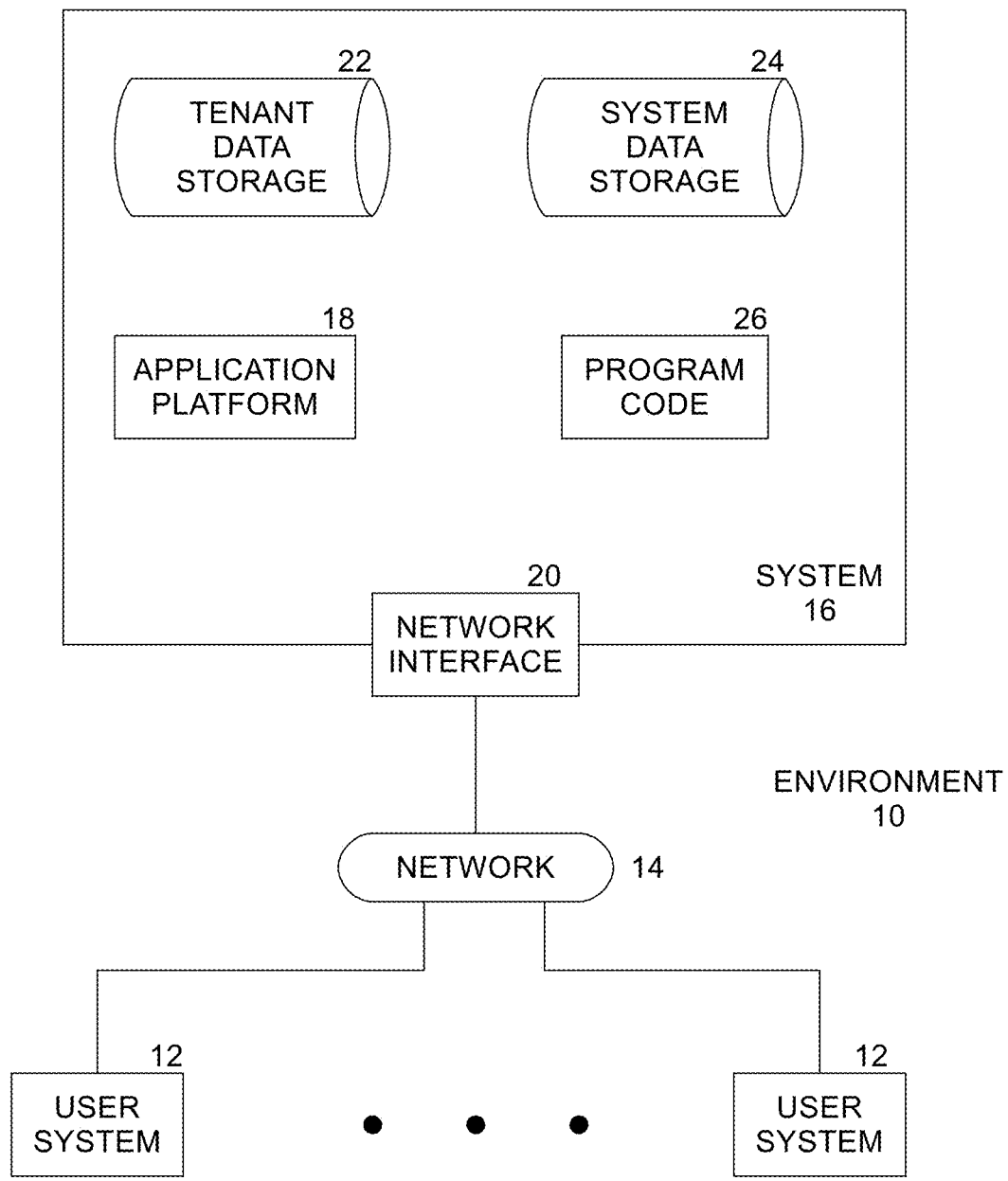
FIG. 5 shows a block diagram of an example of a computing environment in which the web page designer application may be used in accordance with some implementations.

FIG. 5 shows a block diagram of an example of an environment 10 in which the present web page design and delivery operations may be used in accordance with some implementations. Computing environment 10 may include one or more user systems 12, network 14, and system 16, where system 16 includes application platform 18, network interface 20, tenant data storage 22, system data storage 24, and program code 26. In other implementations, environment 10 may not have all of these components and/or may have other components instead of, or in addition to, those listed above.

The system 16 includes hardware and software to implement application server 104, web page designer 102, and/or web server 116 and/or web page cache 118. User systems 12 are electronic devices used by one or more users (such as developer devices 107 and/or consumer devices 126) that subscribe to services (e.g., web page delivery) provided by the cloud computing services implemented by the system 16. User systems 12 might interact via a network 14 with the system 16. Further, in one implementation, the system 16 is a multi-tenant cloud computing architecture supporting multiple services, such as software as a service (SaaS) (e.g., customer relationship management (CRM) service provided by Salesforce.com, Inc.), platform as a service (PaaS) (e.g., execution runtime, database, application development tools; such as Force.com®, Heroku™, and Database.com™ by Salesforce.com, Inc.), and/or infrastructure as a service (IaaS) (virtual machines, servers, storage). In some implementations, such a platform as a service allows for the creation, management and execution of one or more applications developed by the provider of the service, vendors accessing the service via user systems 12, or third-party application developers accessing the system 12. The system 16 may utilize methods for providing web page design and delivery, as described above. This allows for the system 16 to provide web page delivery in an efficient and scalable manner.

Network 14 is any network or combination of networks of devices that communicate with one another. For example, network 14 can be any one or any combination of a local area network (LAN), wide area network (WAN), telephone network, wireless network, point-to-point network, star network, token ring network, hub network, or other appropriate configuration. Network 14 can include a Transfer Control Protocol and Internet Protocol (TCP/IP) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

Each user system 12 is an end user electronic device, such as a desktop personal computer, workstation, laptop, personal digital assistant (PDA), tablet computer, cell phone, etc. Each user system 12 typically includes one or more user interface devices, such as a keyboard, a mouse, trackball, touch pad, touch screen, pen or the like, for interacting with a graphical user interface (GUI) provided on a display (e.g., a monitor screen, liquid crystal display (LCD), etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. User systems 12 might communicate with system 16 using TCP/IP and, at a higher network level, use other common Internet protocols to communicate, such as hypertext transport protocol (HTTP), file transfer protocol (FTP), Andrew file system (AFS), wireless application protocol (WAP), etc. In an example where HTTP is used, user system 12 might include an HTTP client commonly referred to as a "browser" for sending and receiving HTTP signals to and from a server at system 16 allowing a user of user system 12 to access, process and view information, pages and applications available to it from system 16 over network 14. Such a server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. However, other alternative configurations may be used instead.

In one implementation, tenant data storage 22 is a multi-tenant database management system (DBMS). In a typical multi-tenant DBMS, a single instance of software may be used to store data from multiple vendors (also known as tenants) and each vendor is provided with a dedicated share of the software instance. The term "data record" generally refers to a data entity created by or on behalf of a vendor. A data record is comprised of a set of fields defined within a database. A database can be viewed as a collection of database objects, such as a set of logical tables, containing data fitted into predefined categories. A "table" is one representation of a database object, and may be used herein to simplify the conceptual description of database objects. In the context of a relational database, each relational database table generally contains one or more data categories logically arranged as columns according to a schema, where the columns of the relational database table are different ones of the fields from the plurality of data records, and where each row of the relational database table are different ones of a plurality data records and contains an instance of data for each category defined by the fields. In some implementations of a cloud database (a database that runs on a cloud platform and access to which is provided as a database service), each database object contains a plurality of data records having fields, where identifiers are used instead of database keys, and wherein relationships are used instead of foreign keys. Regardless, by way of example, a data record can be for a business partner or potential business partner of a vendor, and can include information describing an entire company, subsidiaries, and/or contacts at the company. As another example, a data record can be for a project that a vendor is working on, such as an opportunity (e.g., a possible sale) with an existing partner, or a project that the vendor is trying to get. As another example, a customer-relationship management (CRM) database may include: 1) a database object that describes a customer with fields for basic contact information such as name, address, phone number, fax number, etc.; and 2) another database object might describe a purchase order, including fields for information such as customer, product, sale price, date, etc.

In some implementations, the tenant data storage 22 includes one or more databases storing the vendor/tenant data (such as information about the vendor's customers/users, information about the vendor's products/services, marketing materials. Thus, in operation, a vendor, through a user system 12, causes the vendor/tenant data to be stored in the tenant data storage 22. In some implementations, a vendor can access system 16 through user system 12 to access its data stored in tenant data storage 22.

In some implementations, system data storage 24 stores system data 25 accessible to system 16 and possibly multiple tenants, while program code 26 (e.g., a runtime engine that materializes application data from metadata; that is, there is a clear separation of the compiled runtime engine (also known as the system kernel), tenant data, and the metadata that describes each application, which make it possible to independently update the system kernel and tenant-specific applications and schemas, with virtually no risk of one affecting the others) for implementing various functions of system 16. In such implementations, the tenant data storage 22, which is a multi-tenant database management system (DBMS), manages one or more databases storing the vendor/tenant data and vendor/tenant application metadata. The tenant data and the system data may be stored in various databases, such as one or more Oracle® databases.

In one implementation, application platform 18 includes an application setup mechanism that supports application developers' creation and management of applications (such as web page designer 102), which may be saved as metadata into tenant data storage by save routines. Invocations to such applications may be coded using procedural language for structured query language (PL/SQL) that provides a programming language style interface. Invocations to applications may be detected by one or more system processes, which manage retrieving application metadata for the subscriber making the invocation and executing the metadata as an application in a virtual machine.

In certain implementations, one or more servers of system 16 is configured to handle requests for any user associated with any organization that is a tenant. Because it is desirable to be able to add and remove servers from the server pool at any time for any reason, there is preferably no server affinity for a user and/or organization to a specific server. In one implementation, therefore, an interface system implementing a load balancing function is communicably coupled between the servers of system 16 and the user systems 12 to distribute requests to the servers. In one implementation, the load balancer uses a least connections algorithm to route user requests to the servers. Other examples of load balancing algorithms, such as round robin and observed response time, also can be used. For example, in certain implementations, three consecutive requests from the same user could hit three different servers, and three requests from different users could hit the same server. In this manner, by way of example, system 16 is multi-tenant, wherein system 16 handles storage of, and access to, different database objects, data and applications across disparate users and organizations.

In certain implementations, user systems 12 (which may be client systems) communicate with the servers of system 16 to request and update system-level and tenant-level data from system 16 that may involve sending one or more queries to tenant data storage 22 and/or system data storage 24. In one implementation of system 16, a server in system 16 automatically generates one or more SQL statements (e.g., one or more SQL queries) that are designed to access the desired information. System data storage 24 may generate query plans to access the requested data from the database.

In some multi-tenant database systems, tenants may be allowed to create and store custom objects, or they may be allowed to customize standard entities or objects, for example by creating custom fields for standard objects, including custom index fields. In certain implementations, for example, all data records of a custom data object are stored in a single multi-tenant physical table, which may contain multiple logical database objects per organization. It is transparent to customers of the system 16 that their multiple database objects are in fact stored in one large table or that their data may be stored in the same table as the data of other customers.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue implementation.

References in the specification to "one implementation," "an implementation," "an example implementation," "some implementations," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. An apparatus comprising:
   one or more processors; and
   a non-transitory machine-readable storage medium having instructions stored therein, which when executed by the one or more processors, causes the apparatus to:
   assign a token to a web page authoring session wherein the token includes at least a web page developer identifier; and
   receive a preview mode input selection to display a preview of a web page during the web page authoring session;
   display, in response to the preview mode input selection, an identifying image encoded with a uniform resource locator (URL) of the preview web page on a display of a first computing device, the URL including a location of the preview web page concatenated with the token of the web page authoring session for the preview web page;
   receive, from a second computing device, the URL obtained by capturing the identifying image on the display of the first computing device by a camera of the second computing device and decoding the captured identifying image to get the URL by the second computing device;
   validate the URL, including the location and the token; and
   send the preview web page to the second computing device when the URL is validated.

2. The apparatus of claim 1, wherein the identifying image comprises a Quick Response (QR) code.

3. The apparatus of claim 1, wherein the token comprises a digitally signed token including one or more of a web page developer identifier, and a session host device identifier.

4. The apparatus of claim 1, the URL to include an identifier of the preview web page concatenated to the token.

5. The apparatus of claim 4, the URL to include one or more preview settings concatenated to the preview web page identifier.

6. The apparatus of claim 5, the preview settings to include one or more of a preview expiration time, one or more visibility rules, and one or more customer segmentations.

7. The apparatus of claim 6, the apparatus to send the preview web page to the second computing device when the preview expiration time has not expired and the one or more visibility rules and the one or more customer segmentations have been applied to render the preview web page.

8. A method comprising:
   assign a token to a web page authoring session wherein the token includes at least a web page developer identifier; and receive a preview mode input selection to display a preview of a web page during the web page authoring session;

display, in response to the preview mode input selection, an identifying image encoded with a uniform resource locator (URL) of the preview web page on a display of a first computing device, the URL including a location of the preview web page concatenated with the token of the web page authoring session for the preview web page;

receive, from a second computing device, the URL obtained by capturing the identifying image on the display of the first computing device by a camera of the second computing device and decoding the captured identifying image to get the URL by the second computing device;

validate the URL, including the location and the token; and send the preview web page to the second computing device when the URL is validated.

9. The method of claim 8, wherein the identifying image comprises a Quick Response (QR) code.

10. The method of claim 8, wherein the token comprises a digitally signed token including one or more of a web page developer identifier, and a session host device identifier.

11. The method of claim 8, the URL including an identifier of the preview web page concatenated to the token.

12. The method of claim 11, the URL including one or more preview settings concatenated to the preview web page identifier.

13. The method of claim 12, the preview settings including one or more of a preview expiration time, one or more visibility rules, and one or more customer segmentations.

14. The method of claim 13, comprising sending the preview web page to the second computing device when the preview expiration time has not expired and the one or more visibility rules and the one or more customer segmentations have been applied to render the preview web page.

15. A non-transitory machine-readable storage medium having instructions stored therein, which when executed by one or more processors of a computing device, causes the computing device to:

assign a token to a web page authoring session wherein the token includes at least a web page developer identifier; and receive a preview mode input selection to display a preview of a web page during the web page authoring session;

display, in response to the preview mode input selection, an identifying image encoded with a uniform resource locator (URL) of the preview web page on a display of a first computing device, the URL including a location of the preview web page concatenated with the token of the web page authoring session for the preview web page;

receive, from a second computing device, the URL obtained by capturing the identifying image on the display of the first computing device by a camera of the second computing device and decoding the captured identifying image to get the URL by the second computing device;

validate the URL, including the location and the token; and send the preview web page to the second computing device when the URL is validated.

16. The non-transitory machine-readable storage medium of claim 15, wherein the identifying image comprises a Quick Response (QR) code.

17. The non-transitory machine-readable storage medium of claim 15, wherein the token comprises a digitally signed token including one or more of a web page developer identifier, and a session host device identifier.

18. The non-transitory machine-readable storage medium of claim 15, the URL to include an identifier of the preview web page concatenated to the token.

19. The non-transitory machine-readable storage medium of claim 18, the URL to include one or more preview settings concatenated to the preview web page identifier.

20. The non-transitory machine-readable storage medium of claim 19, the preview settings to include one or more of a preview expiration time, one or more visibility rules, and one or more customer segmentations.

21. The non-transitory machine-readable storage medium of claim 20, the apparatus to send the preview web page to the second computing device when the preview expiration time has not expired and the one or more visibility rules and the one or more customer segmentations have been applied to render the preview web page.

* * * * *